(12) United States Patent
Hennequin et al.

(10) Patent No.: US 10,024,186 B2
(45) Date of Patent: Jul. 17, 2018

(54) VARIABLE PITCH GUIDE VANE MADE OF COMPOSITE MATERIALS

(71) Applicant: SNECMA, Paris (FR)

(72) Inventors: Stephane Pierre Roger Hennequin, Massy (FR); Julien Prevost, Juvisy sur Orge (FR); Ziyad Karmy, Paris (FR)

(73) Assignee: SNECMA, Paris (FR)

( * ) Notice: Subject to any disclaimer, the term of this patent is extended or adjusted under 35 U.S.C. 154(b) by 486 days.

(21) Appl. No.: 14/566,889

(22) Filed: Dec. 11, 2014

(65) Prior Publication Data

US 2015/0167490 A1    Jun. 18, 2015

(30) Foreign Application Priority Data

Dec. 13, 2013  (FR) ...................................... 13 62622

(51) Int. Cl.
| | | |
|---|---|---|
| *F01D 17/14* | (2006.01) | |
| *B23P 15/04* | (2006.01) | |
| *F01D 9/02* | (2006.01) | |
| *F04D 29/40* | (2006.01) | |

(Continued)

(52) U.S. Cl.
CPC .............. *F01D 17/14* (2013.01); *B23P 15/04* (2013.01); *F01D 9/02* (2013.01); *F01D 17/162* (2013.01); *F04D 29/023* (2013.01); *F04D 29/403* (2013.01); *F04D 29/4213* (2013.01); *F04D 29/444* (2013.01); *F04D 29/462* (2013.01); *F04D 29/542* (2013.01); *F04D 29/563* (2013.01); *F01D 5/147* (2013.01); *F01D 5/282* (2013.01); *F05C 2253/04* (2013.01);
(Continued)

(58) Field of Classification Search
CPC ........ F01D 17/16; F01D 17/17; F01D 17/165; F01D 9/02; F01D 17/162; F01D 5/147; F01D 5/282; F04D 29/46; F04D 29/462; F04D 29/466; F04D 29/56; F04D 29/563; F04D 29/566; B23P 15/04; F05C 2253/04; F05D 2300/603; F05D 2300/6012; F05D 2300/6034; Y10T 29/49323

See application file for complete search history.

(56) References Cited

U.S. PATENT DOCUMENTS 5,380,152 A * 1/1995 Sikorski ............. B29D 99/0025
                                                      415/160
5,392,514 A    2/1995 Cook et al.
(Continued)

FOREIGN PATENT DOCUMENTS

DE    103 23 132 A1    12/2004
EP    1 215 365 A1      6/2002
(Continued)

OTHER PUBLICATIONS

French Preliminary Search Report dated Aug. 27, 2014 in French Application 13 62622, filed on Dec. 13, 2013 (with English Translation of Categories of Cited Documents).

*Primary Examiner* — Logan Kraft
*Assistant Examiner* — Danielle M Christensen
(74) *Attorney, Agent, or Firm* — Oblon, McClelland, Maier & Neustadt, L.L.P.

(57) ABSTRACT

A variable stator vane for a compressor guide vane is provided. The vane includes a blade and a pivot. The pivot includes an internal pivot element and a pivot cap. The blade and the internal pivot element are each made from a composite material. At least one contact surface of the pivot cap is metallic.

16 Claims, 4 Drawing Sheets

(51) Int. Cl.
  *F04D 29/02* (2006.01)
  *F04D 29/44* (2006.01)
  *F04D 29/46* (2006.01)
  *F04D 29/54* (2006.01)
  *F04D 29/56* (2006.01)
  *F01D 17/16* (2006.01)
  *F04D 29/42* (2006.01)
  *F01D 5/28* (2006.01)
  *F01D 5/14* (2006.01)

(52) U.S. Cl.
  CPC ...... *F05D 2230/60* (2013.01); *F05D 2250/51* (2013.01); *F05D 2300/43* (2013.01); *F05D 2300/603* (2013.01); *F05D 2300/6034* (2013.01); *Y02T 50/672* (2013.01); *Y10T 29/49323* (2015.01)

(56) References Cited

U.S. PATENT DOCUMENTS

| | | | | |
|---|---|---|---|---|
| 6,676,378 | B2* | 1/2004 | Corbin | F01D 5/147 |
| | | | | 29/889 |
| 7,753,653 | B2* | 7/2010 | Cairo | F04D 29/023 |
| | | | | 415/200 |
| 8,636,466 | B2* | 1/2014 | Cortequisse | F01D 9/042 |
| | | | | 415/138 |
| 9,217,333 | B2* | 12/2015 | Berard | F01D 5/282 |
| 9,228,438 | B2* | 1/2016 | Dube | F01D 17/162 |

FOREIGN PATENT DOCUMENTS

FR    2 897 639 A1    8/2007
FR    2 933 955 A1    1/2010

* cited by examiner

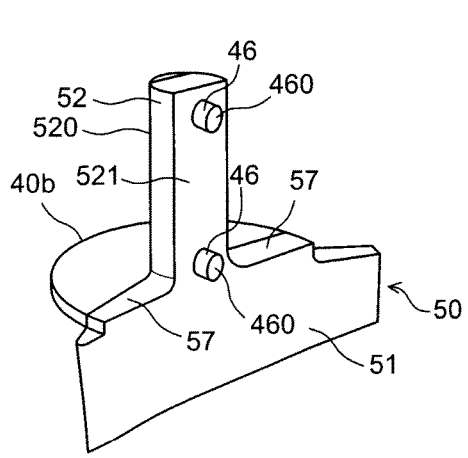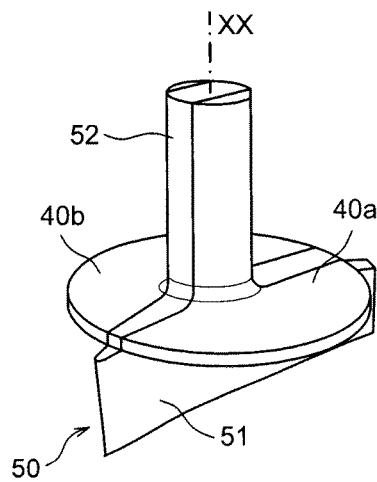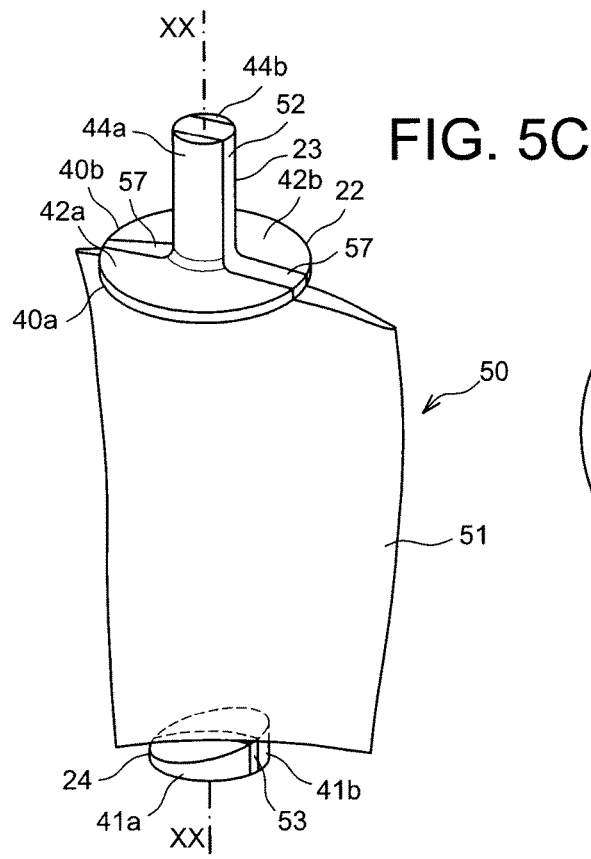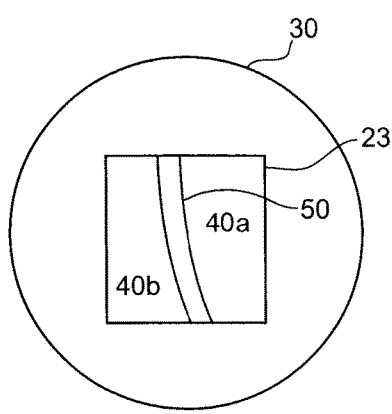
FIG. 5A
FIG. 5B
FIG. 5C
FIG. 5D

VARIABLE PITCH GUIDE VANE MADE OF COMPOSITE MATERIALS

TECHNICAL FIELD AND PRIOR ART

The invention applies to a variable pitch guide vane structure. Variable stator vanes (VSV) have the specific property that they can be manoeuvred. As suggested by their name, their angle of incidence relative to the airflow from the upstream stage is modified during the different flight phases. This angle of incidence is called the pitch angle.

VSVs are strongly affected by their environment (pressure, temperature, mechanical stresses, etc.).

Under these difficult conditions, VSVs must be able to perform at least two roles:
- guide the airflow from the upstream stage: aeromechanical function dependent on the blade geometry;
- be capable of pivoting about the pitch axis: mechanical function performed by a rotation guidance and a drive system.

Fully metallic variable stator vanes are known in prior art. In general, it is desirable to be able to reduce the mass of components of an aircraft engine. The invention applies to a new variable stator vane architecture with lower mass than according to prior art.

PRESENTATION OF THE INVENTION

The variable stator vane according to the invention comprises a blade and at least one pivot, the pivot comprising an internal pivot structural element and a cap, the blade and the internal pivot structural element each being made from a composite material, at least one contact surface of the pivot cap being metallic.

The invention can be advantageously used to make caps, the blade and the internal structural elements of the pivots separately so as to dissociate the fabrication of a complex shape into simpler methods. Thus, fabrication costs remain low, the global mass of the blade remains low and each sub-component can benefit from a material chosen as a function of its specific fabrication constraints.

Thus, the structural parts of the guide vanes (blade and internal structural elements of pivots) are made of composite materials, while the surfaces of the pivots in contact with the other parts of the engine are metallic. Therefore, the invention has the advantage that it substantially reduces the total mass of variable stator vanes (VSVs) compared with existing designs, while having metallic contact surfaces, good friction properties, good strength and optimum life.

The mass reduction can reduce engine consumption.

Furthermore, variable stator vanes according to prior art have a connection fillet between the blade and the pivot. The blade structure according to the invention can eliminate the need for such a connection fillet in the turbomachine flowstream.

If there is no fillet between the blade and the pivots, the airflow is more laminar, thus improving the performances of the guide vane assembly. The gain due to this lack of a connection radius is more visible on small blades, in which the ratio between the radius and the height of the aerodynamic profile is low. Scaling of this radius is not always feasible on a forged guide vane.

The invention has the further advantage that its fabrication costs are competitive.

Advantageously, the internal pivot element is assembled on a cleat that is made in a single piece from the same material as the blade.

Advantageously, the blade is made from a first composite material and the internal pivot element is made from a second composite material distinct from the first composite material.

In one particularly advantageous embodiment, the first composite material is a material with long fibres for example a pre-impregnated 2D or woven 3D type of material.

In one particularly advantageous embodiment, the second composite material is a material with short fibres and an organic matrix.

Advantageously, the cap is fully metallic.

Advantageously, the blade has an aerodynamic profile with a built-in leading edge.

In one advantageous embodiment, the internal pivot element is assembled/glued onto the cleat.

Alternately, the internal pivot element is injected on the cleat.

The invention also relates to a method for manufacturing a variable stator vane as disclosed above, comprising the following steps:
- assembly of an internal pivot element on a cleat of the vane end plate;
- assembly of the cap onto the cleat.

In one particular embodiment, the internal pivot element is injected on the cleat before the cap is assembled on the cleat.

Alternately, the internal pivot element is injected on the cleat after the cap has been assembled on the cleat.

As a variant, the internal pivot element is an add-on insert and/or is glued on the cleat.

The invention also applies to a turbomachine with a variable stator vane like that disclosed above, pivoted relative to a fairing defining the flow stream of the turbomachine.

BRIEF DESCRIPTION OF THE DRAWINGS

We will now describe non-limitative examples of embodiments of the invention with reference to the appended drawings among which:

FIGS. 5A and 5B are two views of the top part of the blade and internal structural elements of the upper pivot;

FIG. 5C is a perspective view of the blade and internal structural elements of the pivot in an assembled state;

FIG. 5D is a diagrammatic cross-sectional view of the upper pivot in the assembled state showing a variant of its internal structural elements.

DETAILED PRESENTATION OF PARTICULAR EMBODIMENTS

Figure 1A:
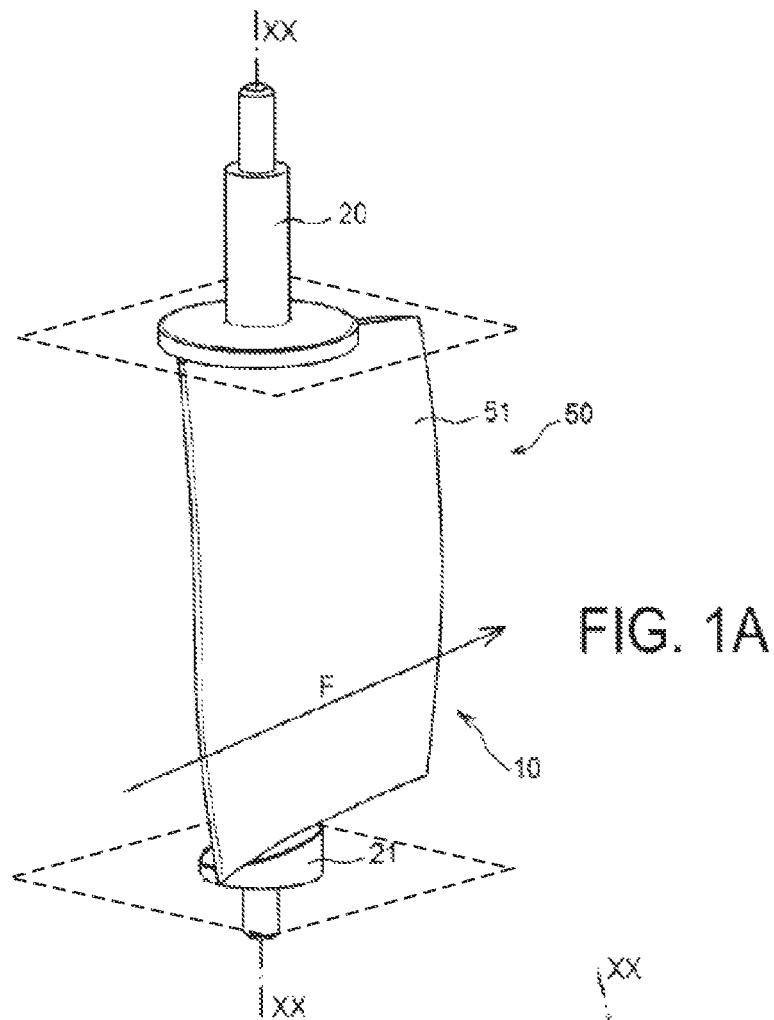
FIG. 1A is a perspective view of a variable stator vane according to the invention comprising a blade, a lower pivot and an upper pivot.

FIG. 1A shows a variable stator vane 10 of a turbomachine compressor guide vane. The vane 10 comprises a central part forming the mobile blade 50 in pivot connection about a pitch axis XX relative to a fairing defining the turbomachine flowstream. The vane 10 also comprises an upper pivot 20 and a lower pivot 21 governed in rotation about the XX axis by an external control device. The vane 10 is designed to be placed among other similar vanes in a turbomachine flowstream in which the upstream-downstream airflow F passes. The "upstream" and "downstream" terms used in the following apply to the airflow through the turbomachine. The terms "upper", "lower", "front" and "back" refer to elements located at the top, bottom, left and right respectively in the figures attached to this application.

Figure 1B:
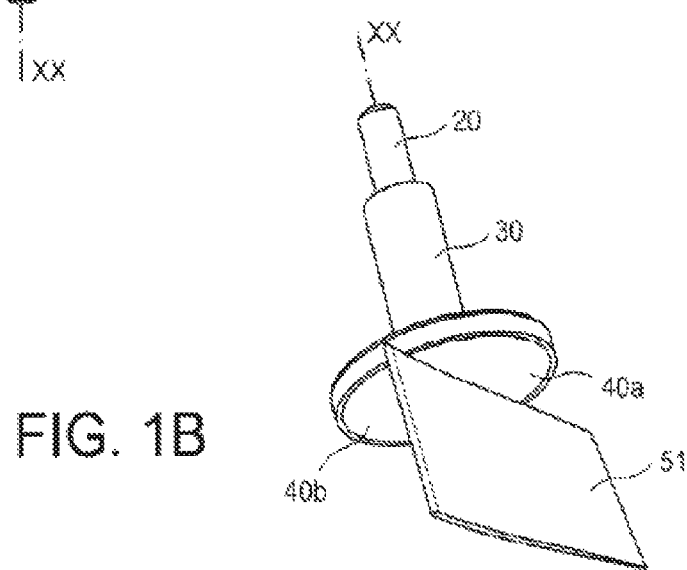
FIG. 1B is a bottom view of the upper pivot in FIG. 1A mounted on the top part of the vane.

The upper pivot 20 is shown in a bottom view in FIG. 1B. The pivot 20 comprises a cap 30 and two inserts or internal structural elements 40a and 40b for which the structure and the assembly will be disclosed below with reference to FIG. 3A.

Figure 2:
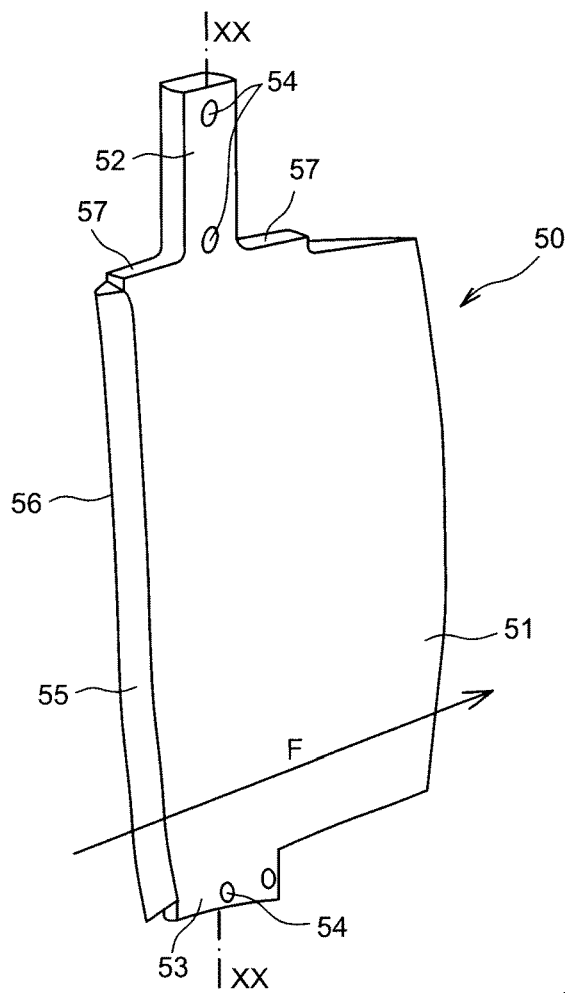
FIG. 2 is a perspective view of a blade that forms part of the vane in FIG. 1A.

FIG. 2 represents the blade 50 in the central part of the vane 10. The blade 50 comprises the aerodynamic profile 51 in the intermediate part. An upper cleat 52 and a lower cleat 53 extend from the aerodynamic profile 51 in extension of this profile. The cleats 52 and 53 are single-piece and are made of the same material as the aerodynamic profile 51.

Advantageously, the blade 50 is made from a composite material with long fibres, for example but not limitatively, a pre-impreg in two dimensions (2D prepreg) or a three-dimensional woven fabric (3D woven).

In the non-limitative example shown, each cleat 52 and 53 contains two orifices 54 passing through them between two parallel surfaces. The number of orifices 54 may be other than two, for example three or four.

In this case the blade comprises two shoulders 57, each located near the top part of the aerodynamic profile 51 along the extension of this profile, on the upstream and the downstream side of the cleat 52.

In the non-limitative example shown, the aerodynamic profile 51 is provided with a metallic protection device 55 on its leading edge 56. This metallic protection device 55 is a metallic insert folded on each side of the front edge 56 extending from the front edge over a given distance.

Figure 3A:
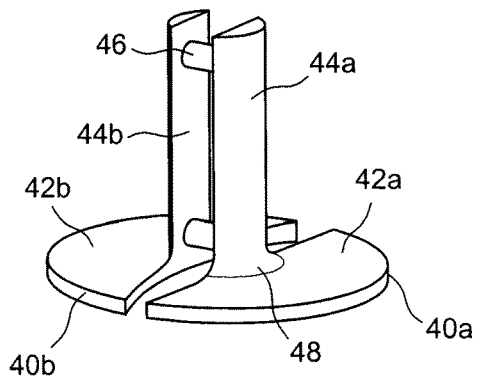
FIGS. 3A and 3B are perspective views of two internal structural elements of the upper pivot, and two internal structural elements of the lower pivot respectively.

FIG. 3A shows two internal structural elements 40a and 40b of the pivot 20.

In a first embodiment, the elements 40a and 40b are injected separately and are then assembled on the upper cleat 52. In this first embodiment, the elements 40a and 40b only exist as parts separable from the blade 50. Therefore, the elements 40a and 40b are shown separately from the blade 50 in FIG. 3A for readability reasons.

In this case, the element 40a comprises a base 42a in the form of a portion of disk, and a tab 44a connected to the base 42a through a fillet 48. Similarly, the element 40b comprises a base 42b and a tab 44b connected to the base 42b through a fillet. Connecting pins 46 connect the tab 44a to the tab 44b. In this case, the pins 46 are made of the same material as one of the elements 40a or 40b.

As a variant, without going outside the scope of the invention, other structures (for example choices of taper angles) or other connecting devices than the pins 46 are provided on or between the elements 40a and 40b and/or the blade 50 to prevent dissociation of elements 40a and 40b with the blade 50.

As a non-limitative variant, the connecting pins 46 are metallic and are used to assemble internal structural elements of the pivots during assembly.

Figure 3B:
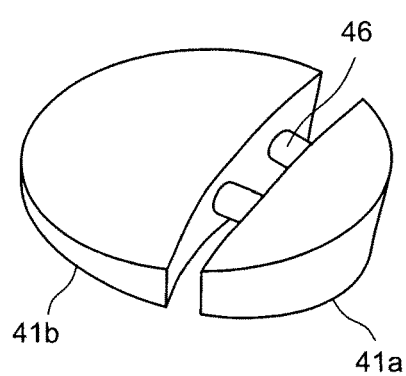

FIG. 3B shows two internal structural elements 41a and 41b of the lower pivot 21.

In the first embodiment, the elements 41a and 41b are injected separately one after the other and are then assembled on the lower cleat 53. In this first embodiment, the elements 41a and 41b exist as parts separable from the blade 50. Therefore the elements 41a and 41b are shown separately from the blade 50 in FIG. 3B for readability reasons.

In the example shown, each of the elements 41a and 41b are in the form of a portion of disk. Connecting pins 46 connect the elements 41a and 41b. The pins 46 are made of the same material as one of the elements 41a and 41b. As before, the connecting pins 46 may be metallic and may be added onto the assembly.

As a variant, other structures (for example the choice of taper angles) or other connecting devices than the pins 46 are provided to prevent separation of the elements 41a and 41b from the blade 50, without going outside the scope of the invention.

FIG. 5A shows the top part of the blade 50 on which the element 40b is assembled by gluing on a first surface 520 of the cleat 52. The connecting pins 46 pass through the orifices 54 and therefore their corresponding end 460 projects from the second surface 521 opposite the first surface 520.

FIG. 5B shows the same high part of the blade 50 after a second assembly step by gluing of the complementary element 40a onto the second surface 521, covering the projecting ends 460 of the pins 46.

Finally, FIG. 5C shows the blade 50 as a whole after successive assembly of the internal elements 41a and 41b on the lower tab 53.

Advantageously, the internal elements 40a, 40b, 41a and 41b are made from a compound type material, in other words a material with short fibres with an organic matrix.

In a second embodiment, the internal elements 40a, 40b are injected simultaneously on the cleat 52, while the internal elements 41a and 41b are injected simultaneously on the cleat 53.

The bases 42a and 42b and the shoulders 57 jointly form a stand 22, in this case in the form of a disk. The tabs 44a and 44b and the cleat 52, form a rod 23. The disk 22 and the rod 23 in this case form the internal structure or the body of the upper pivot 20. The rod 23 shown in FIG. 3 has a cylindrical shape with a circular cross-section. As a non-limitative variant, the section of the stand 22 and/or the rod 23 may be different, for example polygonal and more particularly they may be square as shown in FIG. 5D.

The elements 41a, 41b and the lower cleat 53 form a stand 24, in this case in the form of a disk. In this case, the disk 24 forms the internal structure or the body of the lower pivot 21.

The geometry of the internal pivot structures (in other words firstly the stand 22 and the rod 23 and secondly the stand 24) is chosen to prevent any separation between the elements 40a, 40b, 41a and 41b and the blade 50. The corresponding geometry of elements 40a, 40b, 41a and 41b and the blade 50 is optimised in order to maximise the gluing area and/or the distribution of forces.

Figure 4A:
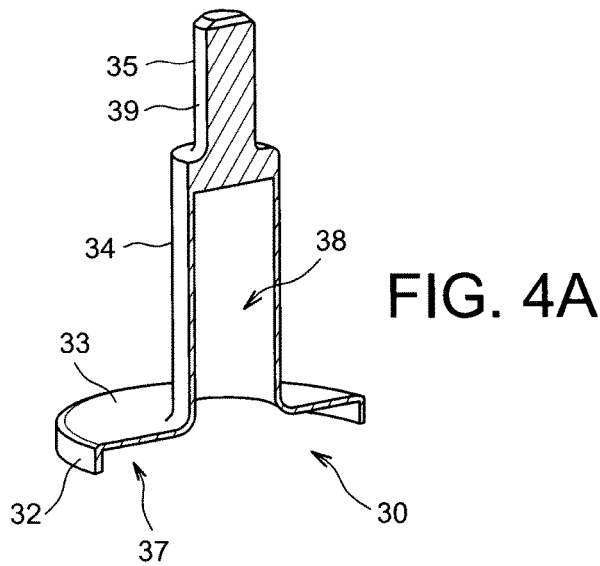
FIGS. 4A and 4C are two sectional and perspective views respectively of a cap of the upper pivot.
Figure 4B:
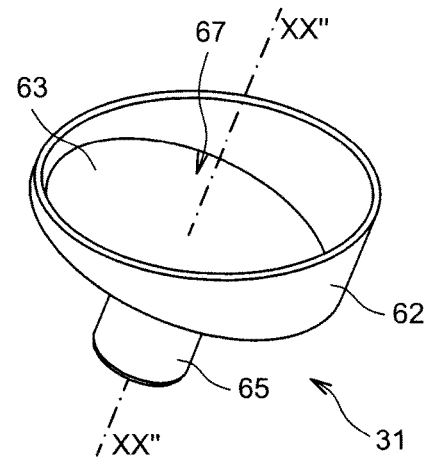
FIG. 4B is a perspective view of a cap of the lower pivot.
Figure 4C:
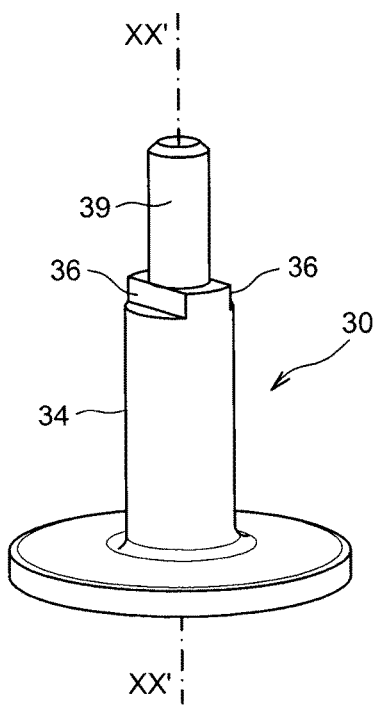

FIG. 4A and FIG. 4C show the cap 30 of the upper pivot 20.

The cap 30 comprises a ring 32, a plate 33, a tubular portion 34 and a rod 35, joined in pairs in this order along the direction of the XX' axis of the cap 30. The ring 32 and the plate 33 jointly delimit a housing 37 with a shape complementary to the shape of the disk 22. The tubular portion 34 comprises an internal housing 38 communicating with the housing 37. The shape of the housing 38 is complementary to the shape of the rod 23. Thus, the cap 30 will cover the pivot body formed by the disk 22 and the rod 23.

In this case two flats 36, for example but not limitatively parallel to each other, are formed on the cap 30 (see FIG. 4C). These two flats 36 form metallic contact surfaces for the external control device. The cap 30 is fixed in rotation with the disk 22 and the rod 23 to enable rotation of the vane 10 by the control device. Other rotational control structures of the vane 10 may be envisaged as variants not shown.

In this case, a thread 39 is provided on the external surface of the rod 35 for a screw-nut type connection with the control device.

FIG. 4B shows the cap 31 of the lower pivot 21.

The cap 31 comprises a ring 62, a plate 63 and a rod 65, connected in pairs in this order along the direction of the XX" axis of the cap 31. The ring 62 and the plate 63 together form a housing 67 with a shape complementary to the shape of the disk 24. The cap 31 will thus cover the pivot body formed by the disk 24. The cap 31 is fixed in rotation with the disk 24.

In this case, the caps 30 and 31 are fully metallic. For example the metal of the caps is non-limitatively chosen from among titanium, steels and aluminium.

The XX' and XX" axes are coincident with the general pitch axis of the vane XX.

The vane 10 comprising the elementary components described above is assembled according to a first manufacturing method non-limitatively described above.

The blade 50, the internal structural elements 40a, 40b, 41a and 41b and the caps 30 and 31 are fabricated individually and then the internal elements 40a, 40b, 41a and 41b are assembled on the blade 50 by gluing and/or insertion. In a second fabrication method, the two elements 40a and 40b or 41a and 41b of the same pivot body are injected simultaneously.

In a third manufacturing method, for the upper pivot 20, a first element among 40a and 40b is injected on the cleat 52, and then the second. The same method is applicable for the lower pivot 21 with one and then the other of the elements 41a and 41b. The order of injection of the elements 40a, 40b, 41a and 41b is non-limitative.

At the end of the first, second and third fabrication methods, the caps 30 and 31 are mounted on the appropriate pivot body 22 and 23 or 24 by gluing, by clamped assembly in a press or by any other method.

As a variant to the second and third manufacturing methods, the internal structure of each pivot 20 or 21 may be directly injected in a single part in the appropriate cap 30 or 31 while the corresponding tab 52 or 53 is in position. All that is necessary to achieve this is to perform a moulding operation using a configuration in which the cap and the blade are positioned in an appropriate mould, and to inject the internal structure material inside the mould through an injection orifice.

The invention claimed is:

1. A compressor variable stator vane assembly, the vane comprising a blade and a pivot,
   the blade comprising an aerodynamic profile and a cleat,
   the pivot comprising an internal pivot element and a pivot cap,
   the blade and the internal pivot element each being made from a composite material,
   at least one contact surface of the pivot cap being metallic,
   wherein the internal pivot element is assembled on the cleat, the cleat being made in a single piece from the same material as the aerodynamic profile,
   wherein the internal pivot element includes a first structural element and a second structural element, each of the first structural element and the second structural element including
   a disk shaped portion, and
   connecting pins connecting the first structural element and the second structural element to each other, the connecting pins passing through orifices provided on the cleat.

2. The compressor variable stator vane according to claim 1, wherein the blade is made from a first composite material, and the internal pivot element is made from a second composite material distinct from the first composite material.

3. The compressor variable stator vane according to claim 2, wherein the first composite material is a material with long fibers.

4. The compressor variable stator vane according to claim 3, wherein the first composite material is a pre-impregnated 2D material or a woven 3D material.

5. The compressor variable stator vane according to claim 2, wherein the second composite material is a material with short fibers and an organic matrix.

6. The compressor variable stator vane according to claim 1, wherein the pivot cap is fully metallic.

7. The compressor variable stator vane according to claim 1, wherein the aerodynamic profile is provided with a built-in leading edge.

8. The compressor variable stator vane according to claim 1, wherein the internal pivot element is injected on the cleat.

9. The compressor variable stator vane according to claim 1, wherein the internal pivot element is glued onto the cleat.

10. A method for manufacturing a variable stator vane according to claim 1, comprising:
   assembling the internal pivot element on the cleat of the blade; and
   assembling the pivot cap onto the cleat.

11. The manufacturing method according to claim 10, wherein the internal pivot element is injected on the cleat before the pivot cap is assembled on the cleat.

12. The manufacturing method according to claim 10, wherein the internal pivot element is injected on the cleat after the pivot cap has been assembled on the cleat.

13. The manufacturing method according to claim 10, wherein the internal pivot element is at least one of an add-on insert and is glued on the cleat.

14. A turbomachine comprising a variable stator vane according to claim 1.

15. The compressor variable stator vane according to claim 1, wherein each of the first structural element and the second structural element includes a tab connected to the disk shaped portion, and the connecting pins connect the tab of the first structural element to the tab of the second structural element.

16. The compressor variable stator vane according to claim 1, wherein the pivot cap includes a ring and a plate which delimit a housing with a shape complementary to a shape of the disk shaped portions of the first structural element and the second structural element.

* * * * *